(12) United States Patent
Nimon et al.

(10) Patent No.: US 8,763,146 B2
(45) Date of Patent: *Jun. 24, 2014

(54) SYSTEM AND METHOD FOR DIGITAL RIGHTS MANAGEMENT OF DIGITAL MEDIA

(71) Applicants: Robert E. Nimon, Dallas, TX (US); Kimmy F. Nimon, Dallas, TX (US); David E. Espenlaub, Dallas, TX (US)

(72) Inventors: Robert E. Nimon, Dallas, TX (US); Kimmy F. Nimon, Dallas, TX (US); David E. Espenlaub, Dallas, TX (US)

(73) Assignee: Upload Technologies S.A., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 13/662,743

(22) Filed: Oct. 29, 2012

(65) Prior Publication Data

US 2013/0179983 A1 Jul. 11, 2013

Related U.S. Application Data

(63) Continuation of application No. 11/626,358, filed on Jan. 23, 2007, now Pat. No. 8,429,752.

(60) Provisional application No. 60/761,554, filed on Jan. 23, 2006, provisional application No. 60/771,727, filed on Feb. 9, 2006.

(51) Int. Cl.
G06F 21/00 (2013.01)
G06F 21/10 (2013.01)
H04L 29/06 (2006.01)

(52) U.S. Cl.
CPC ............ *G06F 21/10* (2013.01); *H04L 63/0428* (2013.01); *H04L 2463/101* (2013.01)
USPC ................ 726/26; 726/27; 380/200; 380/201

(58) Field of Classification Search
CPC ................ G06F 21/10; H04L 63/0428; H04L 2463/101
USPC .............................. 726/26, 27; 380/200, 201
See application file for complete search history.

(56) References Cited

U.S. PATENT DOCUMENTS

| | | | | |
|---|---|---|---|---|
| 6,330,670 | B1 * | 12/2001 | England et al. | 713/2 |
| 6,772,340 | B1 * | 8/2004 | Peinado et al. | 713/168 |
| 6,898,706 | B1 * | 5/2005 | Venkatesan et al. | 713/167 |
| 6,948,073 | B2 * | 9/2005 | England et al. | 726/32 |
| 7,024,393 | B1 * | 4/2006 | Peinado et al. | 705/59 |

(Continued)

OTHER PUBLICATIONS

Shire; Advanced mobile security in silicon; Secure Mobile Communications Forum: Exploring the Technical Challenges in Secure GSM and WLAN, 2004, Date of Conference: Sep. 23-23, 2004, Conference Location: London , pp. 5/1-5/6; The 2nd IEE (Ref. No. 2004/10660); IEEE Xplore.*

(Continued)

*Primary Examiner* — Bradley Holder
(74) *Attorney, Agent, or Firm* — Scott T. Griggs; Griggs Bergen LLP

(57) ABSTRACT

A system and accompanying method for Digital Rights Management (DRM) are disclosed that permit arbitrary forms of digital media to be vended in a networked environment. Special purpose renderers are distributed with each particular instance of digital media. Each renderer may include a tailored set of controls allowing the owner of the digital media to restrict the use thereof.

13 Claims, 7 Drawing Sheets

(56) References Cited

U.S. PATENT DOCUMENTS

| | | | |
|---|---|---|---|
| 7,051,005 B1* | 5/2006 | Peinado et al. | 705/57 |
| 7,073,063 B2* | 7/2006 | Peinado | 713/171 |
| 2002/0186844 A1 | 12/2002 | Levy et al. | |
| 2003/0014655 A1* | 1/2003 | England et al. | 713/200 |
| 2003/0056103 A1* | 3/2003 | Levy et al. | 713/176 |
| 2004/0054920 A1 | 3/2004 | Wilson et al. | |
| 2005/0060266 A1 | 3/2005 | DeMello et al. | |
| 2005/0094810 A1* | 5/2005 | Kuan et al. | 380/200 |
| 2006/0062426 A1* | 3/2006 | Levy et al. | 382/100 |

OTHER PUBLICATIONS

Burns; Publishers and technology: Face to face; Publishing Research Quarterly Fall 1997, vol. 13, Issue 3, pp. 3-102; SpringerLink.*

International Search Report, PCT/US2007/003424, Aug. 23, 2007.

Kim, Junil; Jeong, Yeonjeong; Yoon, Kisong; Ryou, Jaecheol; A Trustworthy End-to-End Key Management Scheme for Digital Rights Management; pp. 635-638; MM'06; Oct. 23, 2006.

Li, Zude; Ye, Xiaojun; Towards a Dynamic Multi-Policy Dissemination Control Model (DMDCON); pp. 33-38; SIGMOD Record; vol. 35, No. 1; Mar. 2006.

Pavlovski, Christopher J.; Staes-Polet, Quentin; Digital Media and Entertainment Service Delivery Platform; pp. 47-55; MSC'O5; Nov. 11, 2005.

Borda, Monica E.; Digital Rights Protection—A Great Challenge of the New Millennium; pp. 207-214; IEEE; Sep. 28-30, 2005.

Matheus, Dr. Andreas; Authorization for Digital Rights Management in the Geospatial Domain; pp. 55-64; DRM'05; Nov. 7, 2005; ACM; 2005.

Dodis, Yevgeniy; Fazio, Nelly; Kiayias, Aggelos; Yung, Moti; Scalable Public-Key Tracing and Revoking; pp. 190-199; PODC'03; Jul. 13-16, 2003; ACM; Jul. 3, 2007.

Kravitz, David W.; Messerges, Thomas S.; Achieving Media Portability Through Local Content Translation and End-to-End Rights Management; pp. 27-36; DRM'05; Nov. 7, 2005.

Landau, Susan; Stratulate, Renee; and Twilleager, Doug; Consumers, Fans, and Control: What the Games Industry Can Teach Hollywood About DRM; pp. 1-7; DRM'06; Oct. 30, 2006.

Anckaert, Bertrand; Venkaatesan, Mariusz Jakubowski Ramarathnam; Proteus: Virtualization for Diversified Tamper-Resistance; pp. 47-57; DRM'06; Oct. 30, 2006.

Egidi, Lavinia; and Furini, Marco; From Digital Audiobook to Secure Digital Multimedia-Book; pp. 1-19; ACM Computers in Entertainment; vol. 4, No. 3; Jul. 2006.

IPER—PCT/US2007/003424, Aug. 21, 2008.

* cited by examiner

SYSTEM AND METHOD FOR DIGITAL RIGHTS MANAGEMENT OF DIGITAL MEDIA

PRIORITY STATEMENT & CROSS-REFERENCE TO RELATED APPLICATIONS

This application claims priority from co-pending U.S. patent application Ser. No. 11/626,358, entitled "System and Method for Digital Rights Management of Digital Media" and filed on Jan. 23, 2007, in the names of Robert E. Nimon, Kimmy F. Nimon, and David E. Espenlaub; which claims priority from (1) U.S. Patent Application No. 60/761,554, entitled "System and Method for Production, Rights Management, and Distribution of Content" and filed on Jan. 23, 2006, in the name of Robert E. Nimon; and (2) U.S. Patent Application No. 60/771,727, entitled "Media Player and System and Method for Generating Same" and filed on Feb. 9, 2006, in the name of Robert E. Nimon; both of which are hereby incorporated by reference for all purposes.

TECHNICAL FIELD OF THE INVENTION

This invention relates, in general, to the distribution of digital media and, in particular, to a system and accompanying method for digital rights management of digital media.

BACKGROUND OF THE INVENTION

Digital media includes software, music, movies, literature, and other forms of digital content. The digital media industry and other digital media owners that distribute digital media have implemented business models that rely on their ability to collect a fee from consumers for each copy or use of a digital work. Presently, once initial distribution of the media has occurred, the unauthorized reproduction or piracy by consumers of the digital media, which is often protected by copyright, constitutes a threat to the viability and profitability of the digital media industry.

Therefore, the digital media industry has begun implementing Digital Rights Management (DRM) or digital restriction management, as it is less frequently referred, to manage and enforce particular controls and restrictions associated with the use of digital media. Existing DRM solutions including content scrambling systems, hardware dongles, product activation, and digital watermarking have proven ineffective. Therefore, a need exists for providing DRM of digital media that allows the controlled or restricted rendering of arbitrary forms of digital content, where the controls and restrictions are flexible and definable by the media owner.

SUMMARY OF THE INVENTION

Accordingly, a system and accompanying method for DRM are disclosed that permit arbitrary forms of digital media to be vended in a networked environment. Further, the system and accompanying method enable a media owner to retain control of intellectual property rights while allowing a consumer transparent access to the digital media. The system and accompanying method also permit data integrity and authenticity to be assessed as well as provide for the confidentiality and privacy of digital media. This is accomplished, in part, by distributing renderers with particular instances of digital media. Each renderer is a special purpose renderer that is specific to the digital media. Each renderer may include a tailored set of controls allowing the owner of the digital media to restrict the use thereof.

In one embodiment, a system operating in a networked environment comprises first and second instances of encumbered digital media. First and second renderers are able to unencumber and render the first and second instances of encumbered digital media, respectively. The second renderer and second instance of encumbered digital media are products of the first renderer operating on the first instance of encumbered digital media in order to create a copy of the first instance of encumbered digital media.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
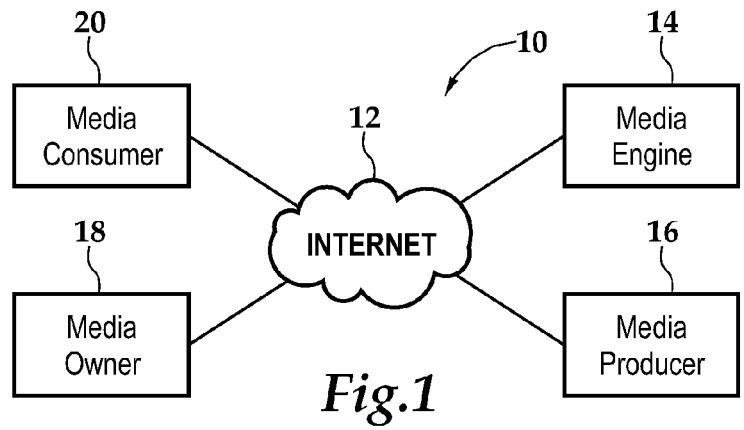
FIG. 1 is a functional block diagram of one embodiment of a system for digital rights management of digital media.

Referring initially to FIG. 1, therein is depicted a networked environment 10 for vending digital media via a computer network that is illustrated as Internet 12. As shown, the networked environment 10 interconnects a media engine 14, a media producer 16, a media owner 18, and a media consumer 20. Media producers, such as the media producer 16, create, by publishing or authoring, for example, digital media using applications that may be distributed between the media engine 14 and media producer 16. By way of example, once digital media ($M_P$) is created, the media producer 16 utilizes the system and accompanying methodology described herein to store an encumbered instance of the digital media ($M_P$), which is digital media ($M_A$), at the media engine 14 so that media consumers, such as the media consumer 20, can consume the content associated with the digital media ($M_A$). The digital media ($M_A$) is encumbered as part of a DRM scheme in order to protect the intellectual property rights of the media owner 18. A special purpose renderer ($L_A$), which may be considered as a special purpose application, that is specific to the encumbered instance of the digital media ($M_A$) is also created and stored at the media engine 14.

The media consumer 20 accesses the media engine via the Internet 12 and selects the content or title associated with the digital media ($M_A$) for consumption. The special purpose renderer ($L_A$) operates on the digital media ($M_A$) and dynamically generates an instance of encumbered digital media ($M_{AC1}$) and a corresponding special purpose renderer ($R_{AC1}$) for the media consumer 20. The media engine 14 vends the instance of encumbered digital media ($M_{AC1}$) and the corresponding special purpose renderer ($R_{AC1}$) to the media consumer 20 and, if necessary, collects a payment or license fee, which may be shared with or forwarded to the media owner 18. It should be appreciated that with respect to certain instances of digital media, the media producer 16 and media owner 18 may be the same entity. Further, it should be appreciated that networking schemes other than server-based architectures are within the teachings of the present invention. By way of example, the architecture depicted in FIG. 1 may be effectuated by a peer-to-peer architecture.

Figure 2:
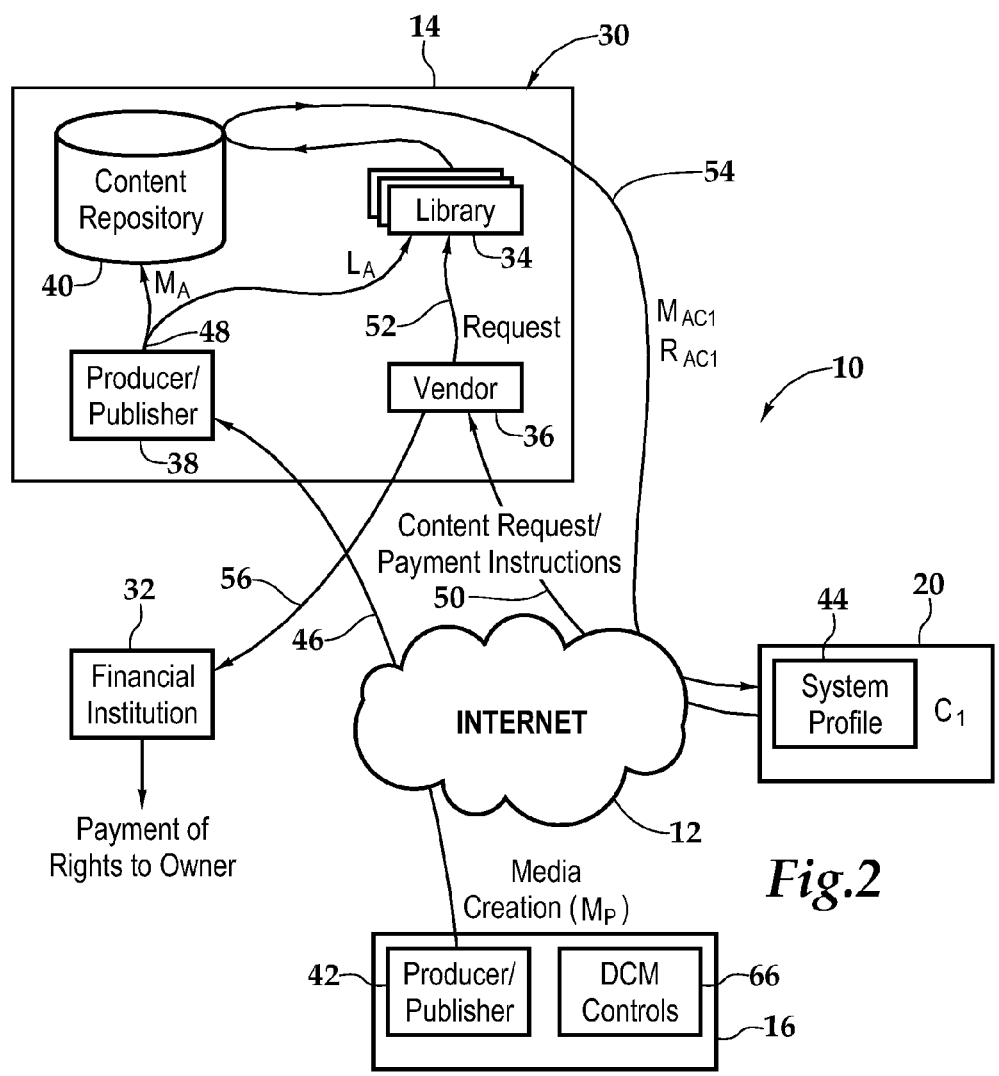
FIG. 2 is a schematic block diagram depicting in further detail the system for digital rights management depicted in FIG. 1.

FIG. 2 depicts in further detail a system 30 for digital rights management operating in the networked environment 10 described in FIG. 1. As previously discussed, the Internet 12 connects the media engine 14 and the media producer 16 as well as the media engine 14 and the media consumer 20. The Internet 12 may also connect the media engine 14 to a financial institution 32. As illustrated, however, the media engine 14 and the financial institution 32 are connected by an alternative system. Other components of the illustrated system 30 may be connected via alternative connections as well.

The media engine 14, the media producer 16, and the media consumer 20 may comprise any combination of hardware, software, and firmware. More specially, the media engine 14 includes a library 34, a vendor 36, a producer/publisher module 38, and a content repository 40. The library 34 is a module or collection of modules, each of which may be referred to as a librarian, that embody the software and hardware necessary to assist the vendor 36 in identifying, locating, and accessing the digital media stored in the content repository 40, which is the central place where digital media is stored and maintained. It should be appreciated that the media engine 14 includes one librarian for each instance of digital media stored and maintained in the content repository 40. That is, there is a direct correspondence between the librarians and instances of digital media. The content repository 40 may comprise multiple databases or files that, similar to the library 34, may be distributed over a network or the content repository 40 may be a location that is directly accessible to the librarian in the library 34 without having to travel across a network. In both of these instances, redundant instances of the library 34 and the content repository 40 may exist.

The vendor 36 includes electronic business applications that facilitate commercial transactions by marketing, selling, and servicing, for example, the digital media over electronic systems, such as the Internet 12, and other computer networks. The producer/publisher module 38 includes authoring applications that are concerned with the production of information and making the information available to the public and consumers, such as media consumer 20.

The media producer 16 may also include a producer/publisher module 42 similar to or complementing the producer/publisher module 38 of the media engine 14. The media consumer 20 includes a system profile 44 which comprises a dynamic object representation of hardware, software, firmware, configuration settings, and data associated with the media producer 16.

In operation, with respect to production, as represented by line 46, the media producer 16 utilizes the producer/publisher modules 38, 42 distributed between the media engine 14 and the media producer's platform to create digital media ($M_P$). The media producer 16 or media owner also designs and/or designates a set of DRM controls 66. The set of DRM controls enforce pre-designed policies that control access to the encumbered digital media. It should be appreciated that the types of DRM controls employed depend on the type of digital media ($M_P$) created. Further, by way of example, the types of DRM controls can vary and include restrictions and allowances on recording, playing, copying, and transmitting.

As depicted by double-headed line 48, from the digital media ($M_P$), an instance of encumbered digital media ($M_A$) is created and stored in the content repository. Additionally, a special purpose renderer ($L_A$) is created that is specific to the encumbered digital media ($M_A$). The special purpose renderer ($L_A$), which is a librarian, is stored in the library 34. The special purpose renderer ($L_A$) is able to unencumber and render the instance of encumbered digital media. The set of digital rights management controls selected by the media producer are integrated into the special purpose renderer ($L_A$).

With respect to consumption, the media consumer 20 contacts the vendor 36 associated with the media engine 14. In one aspect, the vendor 36 functions similarly to a download service that permits the media consumer 20 to browse the inventory of digital media titles on offer. Once a selection has been made and the media consumer 20 sends a content request and payment instructions (if applicable), as represented by line 50, the vendor 36 forwards an associated request, as represented by line 52, to the appropriate librarian ($L_A$). The librarian ($L_A$) accesses the content repository 40 where the desired digital media is known to be available. As previously discussed, the content repository 40 stores an encumbered instance of the digital media ($M_A$).

As depicted by line 54, once the librarian ($L_A$) accesses the instance of encumbered digital media ($M_A$), the librarian ($L_A$) generates a copy of the encumbered digital media for the media consumer 20. This copy is presented as digital media ($M_{AC1}$). More specifically, the librarian ($L_A$) unencumbers the encumbered digital media ($M_A$) and creates a new and unique encumbered instance of the digital media ($M_{AC1}$) as well as a special purpose renderer ($R_{C1}$) that corresponds to the encumbered instance of the digital media ($M_{AC1}$). The instance of encumbered digital media ($M_{AC1}$) and the corresponding special purpose renderer ($R_{AC1}$) are sent to the media consumer 20. Meanwhile, as depicted by arrow 56, the vendor 36 relays the payment instructions from the media consumer through the financial institution 32 to complete the payment transaction and ensure the media owner receives payment.

Figure 3:
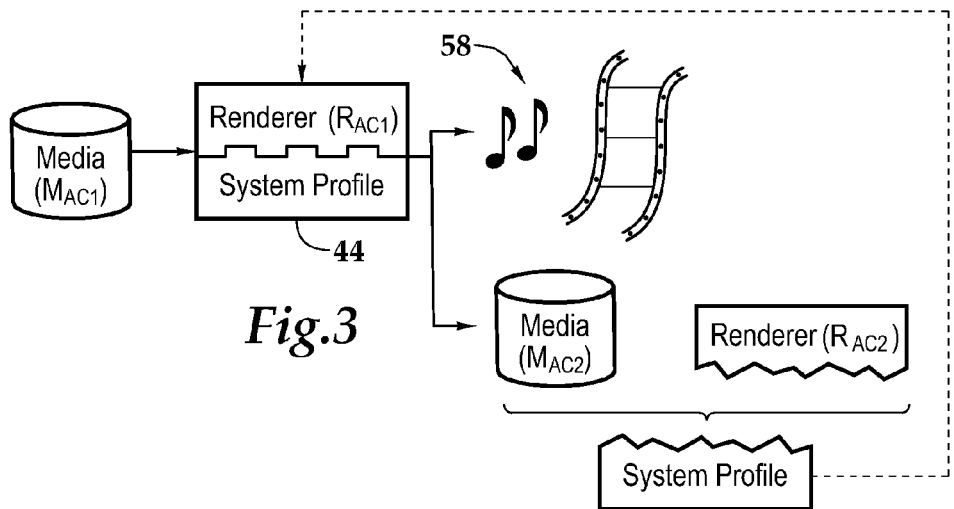
FIG. 3 is a schematic block diagram of one embodiment of the rendering and copying of digital media according to the teachings presented herein.

FIG. 3 depicts one embodiment of the rendering and copying of the digital media ($M_{AC1}$) according to the teachings presented herein. The digital media ($M_{AC1}$) may include software, music, movies, literature, and other forms of digital content implementing audio, imagery, video, and text, for example. The special purpose renderer ($R_{AC1}$) is specific to the digital media ($M_{AC1}$) and operable to unencumber and render the digital media ($M_{AC1}$), by for example, deobfuscating the digital media ($M_{AC1}$), decompressing the digital media ($M_{AC1}$), and finally rendering the digital media ($M_{AC1}$) so that the media consumer can consume the content, which is represented by numeral 58 and the accompanying musical note and film reel. Further, the special purpose renderer ($R_{AC1}$) includes the set of digital rights management controls that enforce pre-designed policies controlling access to the encumbered digital media ($M_{AC1}$).

As indicated by the superposition of the renderer ($R_{AC1}$) on the system profile 44, in one implementation, the renderer ($R_{AC1}$) is only operable to render the digital media ($M_{AC1}$) on a particular system profile or system profiles. As such, the DRM systems and methods presented herein provide for a correspondence between the digital media and the renderer as well as between the renderer and the system profile. The digital media may only be rendered by a particular special purpose renderer and similarly, in one particular implementation, the special purpose renderer may only be utilized on a particular system profile or set of system profiles.

Further, as will be discussed in more detail hereinbelow, the rendering must be in compliance with the DRM controls integrated into the renderer ($R_{AC1}$). By way of example, the digital media may be a song and the DRM controls may relate to duplication and not permit the copying of the digital media. In this case, a rendering that played the digital media would be permitted, but a rendering that copied the digital media would not be permitted. Continuing with this example, the DRM controls may relate to access and permit the song to be played only 10 times. In this case, a rendering that played the song for the $9^{th}$ time would be in compliance with the DRM controls while a rendering that played the song for the $11^{th}$ time would not be in compliance and would not be permitted to occur.

With respect to copying, consumer $C_1$ wants to make a copy of the media ($M_{AC1}$), the copy being designated as media ($M_{AC2}$), for consumer $C_2$ which utilizes a system having a system profile 60. The copy ($M_{AC2}$), may comprise a duplication or artifact of the information contained in the content of the media ($M_{AC1}$). The DRM controls of the media ($M_{AC2}$) may be identical or include a subset of the controls depending on the parameters set in the original DRM controls. Further, in some instances, consumer $C_1$ may modify the DRM controls that will be integrated into the special purpose renderer ($R_{AC2}$) that will be generated for consumer $C_2$.

Consistent with the DRM controls integrated into the renderer ($R_{AC1}$), the special purpose renderer ($R_{AC1}$) operates on the instance of encumbered digital media ($M_{AC1}$) to generate an instance of encumbered digital media ($M_{AC2}$) and a corresponding renderer ($R_{AC2}$). More specifically, the special purpose renderer ($R_{C1}$) unencumbers the instance of encumbered digital media ($M_{AC1}$) and utilizes the system profile 60 to produce the special purpose renderer ($R_{AC2}$) and the instance of encumbered digital media ($M_{AC2}$). By way of example, variables for the algorithms and/or encipherments utilized in the encumbrance and generation of the encumbered digital media ($M_{AC2}$) may be based on the hardware, software, firmware, configuration settings, or data associated with the system profile 60, system profile 44, or the unencumbered media contained in the encumbered digital media ($M_{AC1}$).

Figure 4:
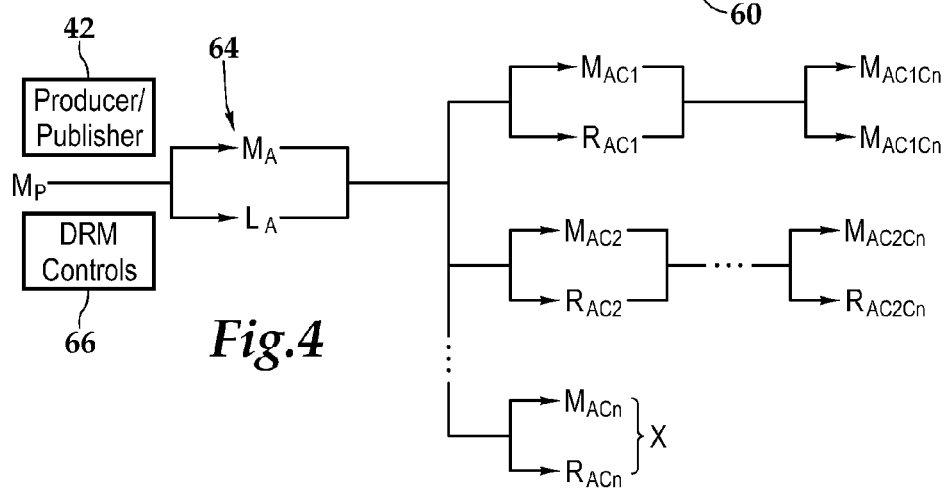
FIG. 4 is a flow diagram of the iterations of digital media and renderers generated in conjunction with one embodiment of the DRM scheme presented herein.

FIG. 4 depicts the iterations, which are generally designated by the number 64, of digital media and special purpose renderers generated in conjunction with the practice of one embodiment of the instant system for DRM. Initially, the media producer utilizing producer/publisher module 42 (and/or producer/publisher module 38 as shown in FIG. 2) creates the digital media ($M_P$) and specifies the DRM controls which are depicted by numeral 66. The producer/publisher module 42 substantially simultaneously generates an encumbered version ($M_A$) of the digital media ($M_P$) and a special purpose renderer ($L_A$) having the DRM controls integrated therewith.

The instance of encumbered digital media ($M_A$) and the librarian ($L_A$) are generated by the producer/publisher module 42 encumbering the media ($M_P$) with the use of a cipher or algorithm. The result is enciphered or obfuscated data, i.e., the encumbered digital media ($M_A$), and the formatting required to render the encumbered digital media ($M_A$), i.e., the librarian ($L_A$). Further the DRM controls are integrated into the librarian ($L_A$). The digital media is not stored or retained by the media engine. By way of example, variables for the ciphers, algorithms, and/or encipherments utilized in the generation of the encumbered digital media ($M_A$) and the accompanying librarian ($L_A$) may be based on the hardware, software, firmware, configuration settings, or data extracted from the system of the media producer or the unencumbered media ($M_P$), for example.

Each special purpose renderer includes an application architecture that is dedicated to rendering a single instance of the encumbered digital media. For example, the special purpose renderer ($L_A$) operates on the encumbered instance of the digital media ($M_A$) to substantially simultaneously generate the encumbered instance of the digital media ($M_{AC1}$) and the special purpose renderer ($R_{AC1}$) for consumption by media consumer ($C_1$). Similarly, the special purpose renderer ($L_A$) operates on the encumbered instance of the digital media ($M_A$) to yield an encumbered instance of the digital media ($M_{AC2}$) and the special purpose renderer ($R_{AC2}$) for the media consumer ($C_2$). Further, each special purpose renderer, including the librarian, includes a set of digital rights management controls integrated into the special purpose renderer for enforcing pre-designed policies controlling access to the encumbered digital media. As part of the generation of the librarian and special purpose renderers, the set of digital rights management controls are transmitted from librarian to special purpose renderer and thereon from special purpose renderer to special purpose renderer.

Consistent with the DRM controls embedded in the special purpose renderer ($L_A$), this process of spawning instances of encumbered digital media and special purpose renderers continues as shown. At any particular time, the result of the spawning process may be a complete or incomplete tree that is n-levels deep. With respect to restricting copying (or other type of rendering), as previously discussed, the copying (or other type of rendering) must be in compliance with the DRM controls integrated into the renderer. With reference to the branch that includes the digital media ($M_{ACn}$) and the accompanying special purpose renderer ($R_{ACn}$), the requested copying operation is not permitted and a new instance of digital media and new special purpose renderer are not generated.

Figure 5A:
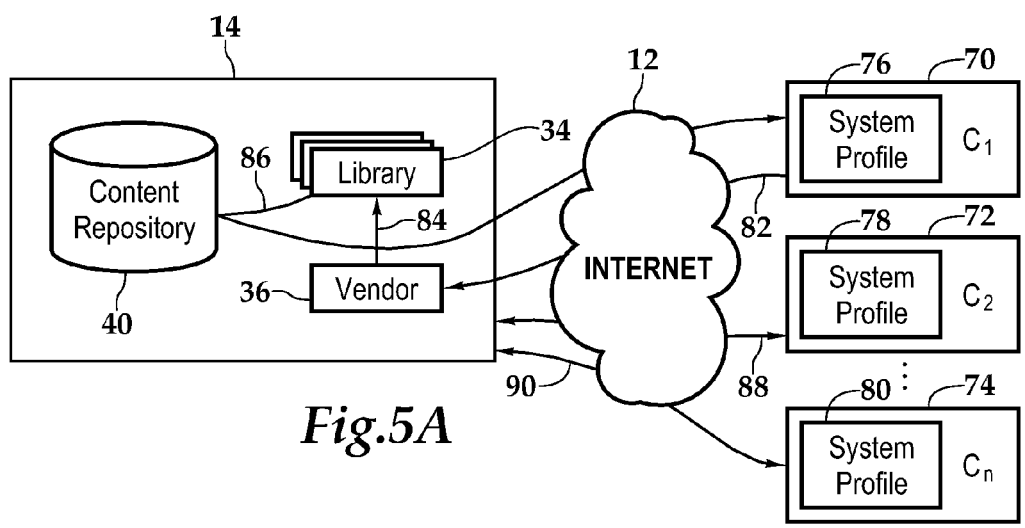
FIG. 5A is a schematic block diagram of one embodiment of a system for digital rights management providing digital media to multiple media consumers.
Figure 5B:
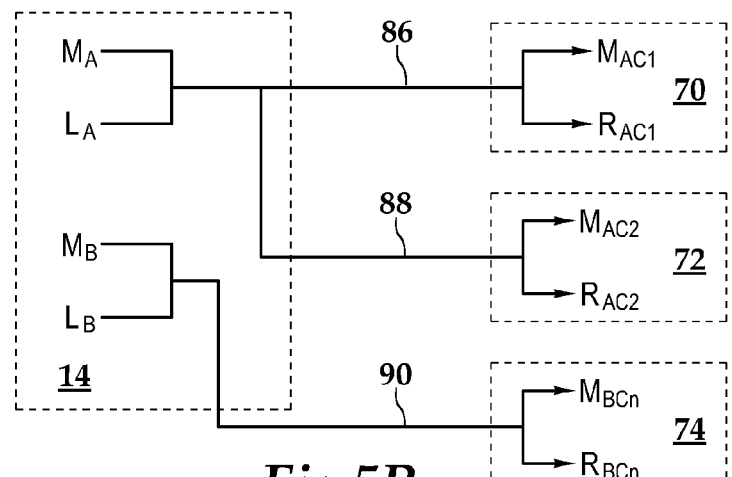
FIG. 5B is a flow diagram of the iterations of digital media and renderers generated in conjunction with the system presented and described in FIG. 5A.

FIGS. 5A and 5B depict one embodiment of a system for digital rights management providing instances of digital media to multiple media consumers, which are labeled 70-74 ($C_1, C_2, \ldots, C_n$). FIG. 5A depicts the system in detail and FIG. 5B illustrates the iterations of digital media and special purpose renderers generated therein. Referring to both FIGS. 5A and 5B, the media consumers 70-74 each include a system profile 76-80, respectively. It should be appreciated that the media consumers 70-74 may be very heterogenous in terms of not only system profiles 76-80 but network connections as well. Further, the system presented herein is operable to accommodate these heterogenous system profiles 76-80 and network connections.

As indicated by line 82, the media consumer 70 requests a particular title from the vendor 36, which, in turn, contacts the appropriate librarian ($L_A$) in library 34 as depicted by line 84. The librarian ($L_A$) retrieves an encumbered instance of digital media ($M_A$) corresponding to the selected title from the content repository 40. The library 34 and the content repository 40 may be co-located or have a distributed database infrastructure. As shown by line 86, the librarian ($L_A$) operating on the encumbered instance of digital media ($M_A$) generates an instance of encumbered digital media ($M_{AC1}$) and a corresponding special purpose renderer ($R_{AC1}$). Both are transferred to the media consumer 70 as shown by line 86.

As illustrated by double-headed arrow line 88, which is being utilized to represent a bidirectional transaction, the media consumer 72 requests the same title as media consumer 70. The librarian ($L_A$) retrieves the encumbered instance of digital media ($M_A$) and generates an instance of encumbered digital media ($M_{AC2}$) and a renderer ($R_{AC2}$), both of which are transferred to media consumer 72. Although the unencumbered ancestral content of the digital media ($M_{AC1}$) and digital media ($M_{AC2}$) are identical, the encumbered instances of digital media [($M_{AC1}$) and ($M_{AC2}$)] are different. Moreover, each is associated with a unique special purpose renderer; namely, encumbered digital media ($M_{AC1}$) is associated with special purpose renderer ($R_{AC1}$) and encumbered digital media ($M_{AC2}$) is associated with special purpose renderer ($R_{AC2}$). As previously discussed, the special purpose renderer ($R_{AC1}$) only renders the instance of encumbered digital media ($M_{AC1}$) and, similarly, the special purpose renderer ($R_{AC2}$) only renders the instance of encumbered digital media ($M_{AC2}$).

With respect to double-headed arrow line 90, the media consumer 74 ($C_n$) requests a different title [the title corresponding to ($M_B$) and not ($M_A$)] than media consumers 70, 72. A librarian ($L_B$) in library 34, which is distinct from librarian ($L_A$), is the librarian associated with encumbered digital media ($M_B$), which is located within content repository 40, that corresponds to the requested title. The librarian ($L_B$) retrieves the encumbered digital media ($M_B$) and generates an instance of encumbered digital media ($M_{BCn}$) and a renderer ($R_{BCn}$), both of which are transferred to media consumer 74.

By way of example, the media consumers may be consuming entertainment digital media, such as songs or books. By way of another example, the media consumers may be consuming corporate or non-entertainment documentation or content (Word, PDF, TIFF, AutoCAD files etc.), rather than consumer playable media. In this implementation, the vendor 36 acts as a policy server or security component of a policy-based network, which may incorporate the Internet 12 or an intranet. The vendor 36 provides authorization services and facilitates tracking and control of files. More specifically, the media engine 14 as a policy engine, allocates resources based on the time of day, authorization privileges, availability of network resources, and any other factors that a network manager may specify when composing policies. With respect to files and documents, the policy server may permit or deny access, control the extend to which a client can use the document (e.g., one-time printing or downloading only), track client use patterns, log changes or modifications, provide automatic updates, eliminate unnecessary redundancy, minimize the need to re-issue documents, and delete outdated data. Accordingly, the systems and accompanying methods presented herein enable an owner to retain control of intellectual property rights while allowing a consumer transparent access to the digital media. The systems and accompanying methods also permit data integrity and authenticity to be assessed as well as provide for the confidentiality and privacy of digital media.

Figure 6A:
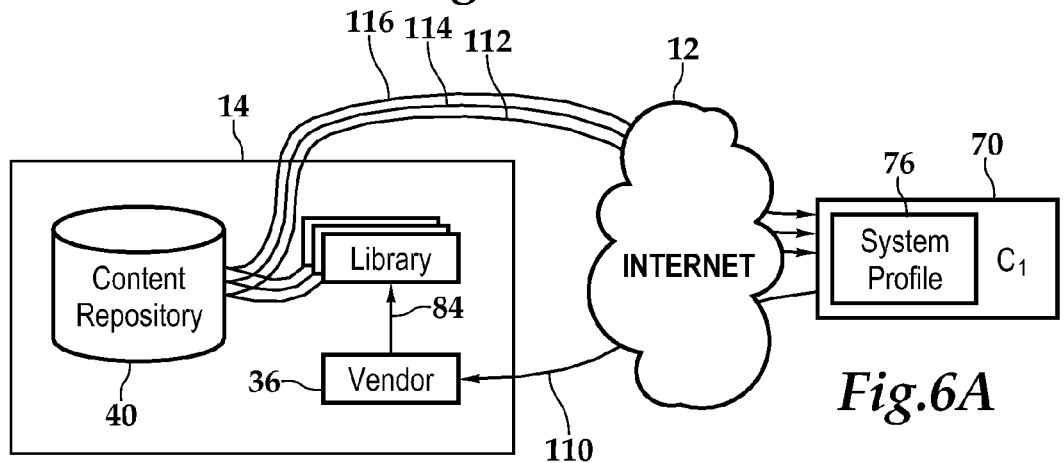
FIG. 6A is a schematic block diagram of one embodiment of a system for digital rights management providing digital media of a large size to a media consumer.
Figure 6B:
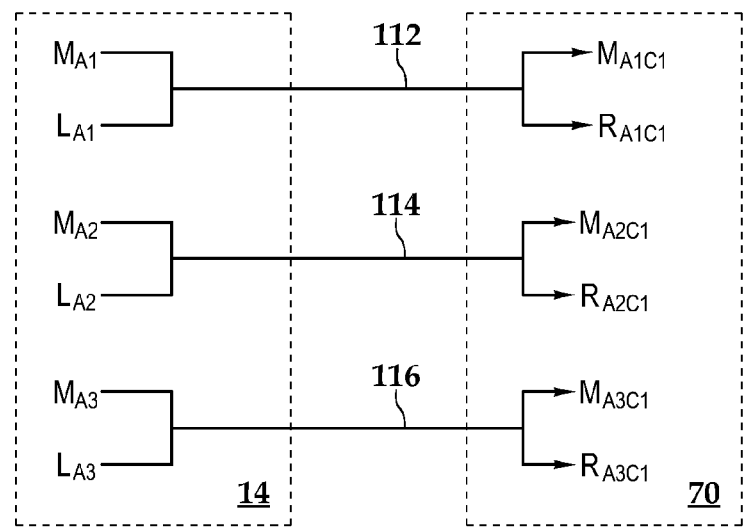
FIG. 6B is a flow diagram of the iterations of digital media and renderers generated in conjunction with the system presented and described in FIG. 6A.

FIGS. 6A and 6B depict one embodiment of a system for digital rights management providing digital media of a large size to a media consumer 70 ($C_1$) having a system profile 76. By way of example, this embodiment may depict an on-demand entertainment application such as video on-demand where digital media such as movies are transmitted from the media engine 14 to a media consumer 70 after a request has been made. Appropriate "video cassette recorder" or "digital video disc player" functionalities, such as play, stop, pause, fastforward, rewind, and scene selection, for example, are provided by the renderer if such functionalities are permitted by the DRM controls.

As indicated by line 110, the media consumer 70 is requesting content of a large size from the vendor 36. With large files, the content may be partitioned into files of approximately the same small fixed-sized or files having of variable sizes. Accordingly, with respect to transmission time, the media files may be synchronous or asynchronous. In the illustrated figure, by way of example, the content has been partitioned into three segments, each of which is an encumbered instance of digital media; $M_A = (M_{A1}, M_{A2}, M_{A3})$.

For each successive file required for the enjoyment of the content, a different librarian accesses a different instance of encumbered digital media. In the illustrated embodiment, the librarians are lettered $L_{A1}$, $L_{A2}$, and $L_{A3}$ and respectively correspond to encumbered instances of digital media, $M_A = [M_{A1}, M_{A2}, M_{A3}]$. It should be appreciated, however, that depending on the size of the content more or less instances of encumbered digital media and librarians may be required and that this is within the teachings of the present invention. With respect to vending and consumption of the content by the media consumer 70, each of the different librarians $L_{A1}$, $L_{A2}$, and $L_{A3}$ is a special purpose renderer that unencumbers and renders a respective instance of digital media.

In particular, as depicted by line 112, the librarian ($L_{A1}$) accesses an instance of encumbered digital media ($M_{A1}$) and operates thereon to generate instance of encumbered digital media ($M_{A1C1}$) and accompanying renderer ($R_{A1C1}$). This application pair consisting of the encumbered digital media ($M_{A1C1}$) and accompanying renderer ($R_{A1C1}$) is transmitted to the media consumer 70. As the instance of encumbered digital media ($M_{A1C1}$) is rendered or being rendered by media consumer 70, as shown by line 114, librarian ($L_{A2}$) accesses instance of encumbered digital media ($M_{A2}$) and generates instance of encumbered digital media ($M_{A2C1}$) and special purpose renderer ($R_{A2C1}$) and transfers the same to the media consumer 70.

Successively, as required by the size of the media, the processes of progressively and iteratively transferring the media continues, and as depicted by line 116, librarian ($L_{A3}$) operates on an instance of digital media ($M_{A3}$) in order to generate an instance of digital media ($M_{A3C1}$) and accompanying renderer ($R_{A3C1}$), both of which are transferred to the media consumer 70 for consumption. In one implementation, the transfer occurs during the rendering of the encumbered digital media ($M_{A2C1}$) by special purpose renderer ($R_{A2C1}$). In another implementation, the transfer may occur after the rendering.

Figure 6C:
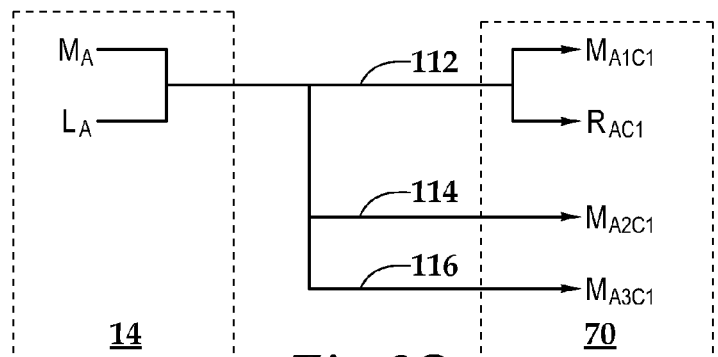
FIG. 6C is a flow diagram of an alternate embodiment of the iterations of digital media and renderers generated in conjunction with the system presented and described in FIG. 6A.

FIG. 6C depicts an alternate embodiment of the iterations of digital media and renderers generated in conjunction with the system presented and described in FIG. 6A. In the illustrated embodiment, one librarian $L_A$ corresponds to a single instance of digital media, $M_A$. More particularly, as depicted by line 112, the librarian ($L_A$) accesses an instance of encumbered digital media ($M_A$) and operates thereon to generate instances of encumbered instances of digital media ($M_{A1C1}$), ($M_{A2C1}$), and ($M_{A3C1}$) and accompanying renderer ($R_{AC1}$). Each of the encumbered instances of digital media ($M_{A1C1}$), ($M_{A2C1}$), and ($M_{A3C1}$) may be regarded as portions of a single large segmented file, the entirety of which may be rendered by a single render, i.e., librarian ($R_{AC1}$). The application pair consisting of the encumbered digital media ($M_{A1C1}$) and the renderer ($R_{AC1}$) is transmitted to the media consumer 70. As the instance of encumbered digital media ($M_{A1C1}$) is rendered or being rendered by media consumer 70 by renderer ($R_{AC1}$), as shown by line 114, instance of encumbered digital media ($M_{A2C1}$) is transferred for rending by the renderer ($R_{AC1}$). Similarly, as the instance of encumbered digital media ($M_{A2C1}$) is rendered or being rendered by media consumer 70, as shown by line 116, instance of encumbered digital media ($M_{A3C1}$) is transferred for rending by the renderer ($R_{AC1}$). It should be appreciated that elements of this embodiment having a single renderer and multiple segmented file portions is applicable to any of the embodiments discussed herein.

Figure 7A:
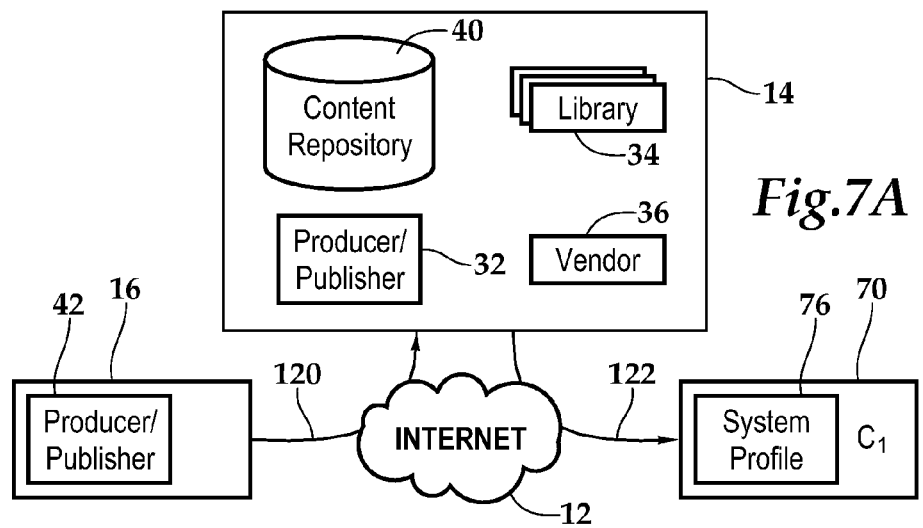
FIG. 7A is a schematic block diagram of one embodiment of a system for digital rights management providing live digital media to a media consumer.
Figure 7B:
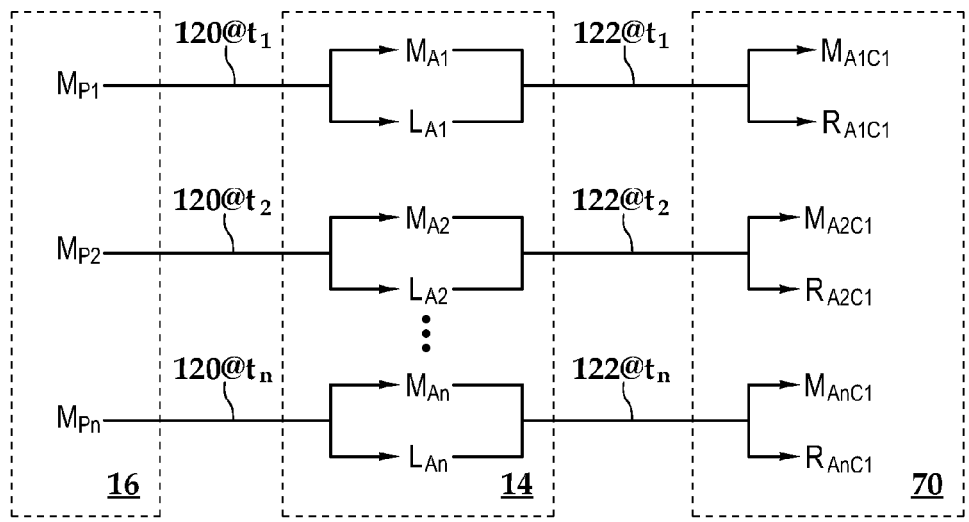
FIG. 7B is a flow diagram of the iterations of digital media and renderers generated in conjunction with the system presented and described in FIG. 7A.

FIGS. 7A and 7B depict one embodiment of a system for digital rights management providing live digital media to a consumer 70. By way of example, this embodiment may depict live applications where content from a live entertainment event or a live video conference is transmitted from the media producer 16 to a media consumer 70 via the media engine 14 after a request has been made. As shown, the content originates with the media producer 16 which is equipped with a producer/publisher module 42 that, as previously discussed, may be associated with the media producer 16, media engine 14, or distributed over a combination thereof.

The media producer 16 utilizes the producer/publisher module 42 or modules 32, 42 to create the content, generally designated $M_P$, which may be partitioned into files based on size or elapsed time, for example. As illustrated, the content ($M_P$) is dynamically and progressively partitioned into the segmented content [$t_1=M_{P1}$, $t_2=M_{P2}$, ..., $t_n=M_{Pn}$]. The media engine 14 successively generates an encumbered instance of digital media for each portion of the partitioned content such that encumbered instances of digital media [$t_1=M_{A1}$, $t_2=M_{A2}$, ..., $t_n=M_{An}$], which are generally indicated by the letter $M_A$, are created and stored in content repository 40, as required. Further, corresponding special purpose renders [$t_1=L_{A1}$, $t_2=L_{A2}$, ..., $t_n=L_{An}$], which are generally indicated by the letter L, that are specific to the respective encumbered instances of digital media [$t_1=M_{A1}$, $t_2=M_{A2}$, ..., $t_n=M_{An}$] are substantially simultaneously generated therewith, and stored in the library 34.

As depicted by line 122, at a times $t_1$ through $t_n$, the media engine 14 through the vendor 36 vends the live content to the media consumer by generating and then sending corresponding pairs of encumbered instances of digital media and renderers to the media consumer as these application pairs become available. The corresponding pairs of encumbered instances of digital media and librarians presented in the following equation (1) are utilized to generate the application pairs presented in equation (2) at the times $t_1, t_2, \ldots, t_n$:

$$[t_1=M_{A1},L_{A1}; t_2=M_{A2},L_{A2}; \ldots ; t_n=M_{An},L_{An}] \quad (1)$$

$$[t_1=M_{A1C1},R_{A1C1}; t_2=M_{A2C1},R_{A2C1}; \ldots ; t_n=M_{AnC1},R_{AnC1}] \quad (2)$$

By way of example, in operation, the producer/publisher 16 creates content ($M_{P1}$) and therefrom an encumbered instance of digital media ($M_{A1}$) and librarian ($L_{A1}$) are generated and appropriately stored at media engine 14. In response to a request from the media consumer 70, the librarian ($L_{A1}$) operates on the encumbered instance of digital media ($M_{A1}$) to generate the first renderer ($R_{A1C1}$) and the encumbered instance of digital media ($M_{A1C1}$), both of which are transmitted to the media consumer 70. The media consumer 70 utilizes the first renderer ($R_{A1C1}$) to render the encumbered instance of digital media ($M_{A1C1}$) and thereby consume the content.

Following the creation of the content ($M_{P1}$), at time $t_2$, content ($M_{P2}$) is created and therefrom encumbered instance of digital media ($M_{A2}$) and librarian ($L_{A2}$) are generated. In one implementation, while or after the first renderer ($R_{A1C1}$) is rendering the encumbered instance of digital media ($M_{A1C1}$), the second renderer ($R_{A2C1}$) and second instance of encumbered media ($M_{A2C1}$) are generated at the media engine 14 and transmitted to the media consumer 70 wherein the media is rendered in a buffer for consumption once the content of encumbered instance of digital media ($M_{A1C1}$) has been consumed. This progressive process of presenting a portion of the content to the media consumer 70 while downloading and buffering a subsequent portion of content continues until the entirety of the content, including the application pair of encumbered instance of digital media ($M_{AnC1}$) and special purpose renderer ($R_{AnC1}$), has been presented to the media consumer 70 at time $t_n$.

Figure 8A:
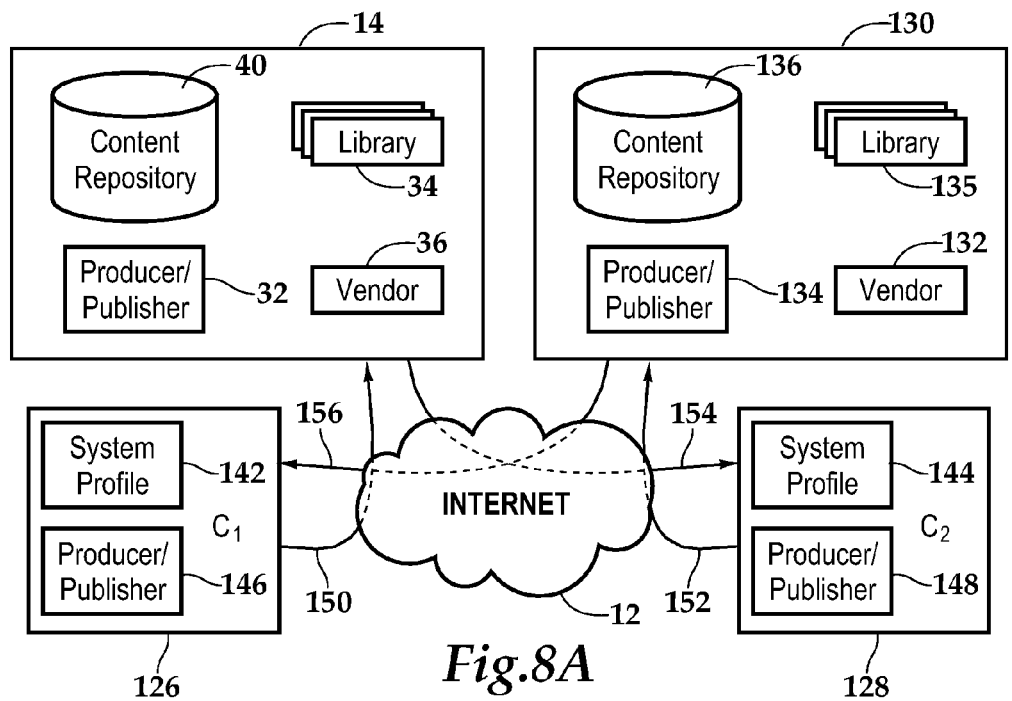
FIG. 8A is a schematic block diagram of one embodiment of a system for digital rights management providing duplexed digital media between two media consumers.
Figure 8B:
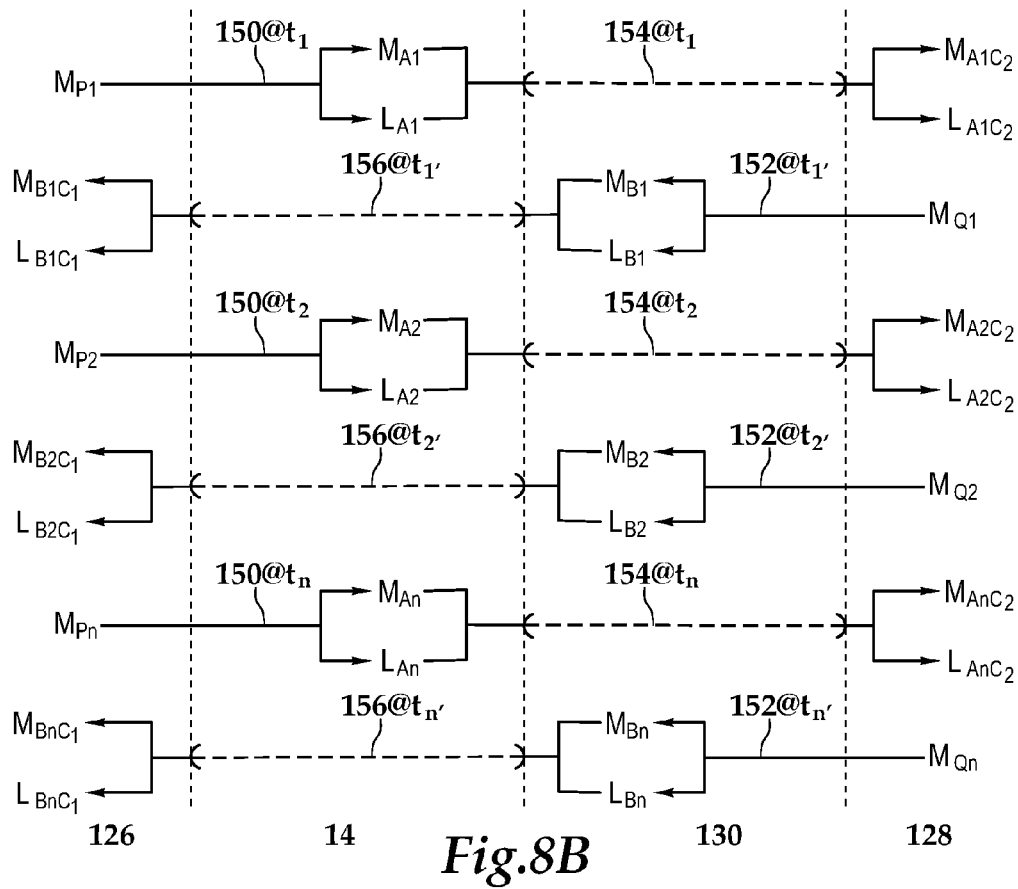
FIG. 8B is a flow diagram of the iterations of digital media and renderers generated in conjunction with the system presented and described in FIG. 8A.

FIGS. 8A and 8B depict one embodiment of a system for digital rights management providing duplexed digital media between two media producers/consumers 126 and 128. Two media engines 14 and 130 are present and, similar to the media engine 14, the media engine 130 includes a vendor 132, a producer/publisher module 134, a library 135, and a content repository 136. In communications, visual data is often utilized to augment more traditional purely audio based systems in applications such as video conferencing or, more generally, video telephony. FIGS. 8A and 8B may depict such an application.

Each media producer/consumer 126 ($C_1$), 128 ($C_2$) respectively includes a system profile 142, 144 and a producer/publisher module 146, 148 that may work in conjunction with its respective counterpart, i.e., producer/publisher module 32 or producer/publisher module 134. It should be appreciated that although two media engines 14 and 130 are depicted, the aforementioned functionalities may be executed with one or more than two media engines. Additionally, the producer/consumer functionalities may be bifurcated as well.

In operation, based on streaming or intermittent content $M_P=[t_1=M_{P1}, t_2=M_{P2}, \ldots, t_n=M_{Pn}]$ that originates with the media consumer/media producer 126 ($C_1$), the media engine 14 creates encumbered instances of digital media having corresponding special purpose renderers or librarians. The encumbered instances of digital media, $[t_1=M_{A1}, t_2=M_{A2}, \ldots, t_n=M_{An}]$ or collectively $M_A$, are stored in the content repository 40 and the corresponding special purpose renderers $[t_1=L_{A1}, t_2=L_{A2}, \ldots, t_n=L_{An}]$ or collectively $L_A$ are stored in the library 34.

Similarly, and substantially simultaneously, based on streaming or intermittent content $M_Q=[t_1=M_{Q1}, t_2=M_{Q2}, \ldots, t_n=M_{Qn}]$, media consumer/media producer 128, in conjunction with media engine 130, creates partitioned instances of digital media having corresponding special purpose renderers (or librarians) which may be designated respectively as $[t_1=M_{B1}, t_2=M_{B2}, \ldots, t_n=M_{Bn}]$ or collectively $M_B$ and $[t_1=L_{B1}, t_2=L_{B2}, \ldots, t_n=L_{Bn}]$ or collectively $L_B$.

Using a progressive process of presenting the partitioned portions of the content that is similar to the process described in FIGS. 7A and 7B, each media engine 14, 130 through the respective vendors 36, 132 vends the live content by sending corresponding pairs of encumbered instances of digital media and renders as they are created in substantially real time. For example, media engine 14 sends the following stream of application pairs to the media producer/consumer 128 as they become available:

$$[t_1=M_{A1C2}, L_{A1C2}; t_2=M_{A2C2}, L_{A2C2}; \ldots; t_n=M_{AnC2}, L_{AnC2}] \quad (3)$$

In the illustrated embodiment, as media producer/consumer 128 receives and renders these application pairs, the media engine 130 sends the following stream of application pairs to the media consumer 126:

$$[t_{1'}=M_{B1C1}, L_{B1C1}; t_{2'}=M_{B2C1}, L_{B2C1}; \ldots; t_{n'}=M_{BnC1}, L_{BnC1}] \quad (4)$$

As alluded to, the application pairs of sets (3) and (4) as defined in paragraphs 68 and 70, respectively, are duplexed such that application pairs can flow in both directions between media consumers in order that simultaneous audio and visual content may be exchanged in substantially real time. Moreover, the order of the transmission and reception of the application pairs may very. In one implementation, such quality of service is provided by over-provisioning the network to ensure content of varying tolerances of jitter is accommodated. For example, the transmission order may be $(t_1, t_{1'}, t_2, t_{2'}, \ldots, t_n, t_{n'})$; $(t_1, t_2, t_{1'}, \ldots, t_n, t_{2'}, \ldots, t_{n'})$; or $(t_{1'}, t_{2'}, \ldots, t_{n'}, t_1, t_2, \ldots, t_n)$.

The duplexed transmission order $(t_1, t_{1'}, t_2, t_{2'}, \ldots, t_n, t_{n'})$ is presented in FIG. 8B wherein, with respect to times $t_1$ and $t_{1'}$, as shown by line 150@$t_1$, media ($M_{P1}$) is produced by media producer/consumer 126 and therefrom the encumbered instance of digital media ($M_{A1}$) and the librarian ($L_{A1}$) are generated and stored at media engine 14. Approximately simultaneously, as shown by line 152@$t_{1'}$, media ($M_{Q1}$) is produced by media producer/consumer 128 and the related encumbered instance of digital media ($M_{B1}$) and the librarian ($L_{B1}$) are stored in the media engine 130.

As shown by line 154@$t_1$, the media engine 14 generates the encumbered instance of digital media ($M_{A1C2}$) and the accompanying special purpose renderer ($L_{A1C2}$) and sends this application pair to the media producer/consumer 128. Please note that the dashed line indicates that the application pair ($M_{A1C2}$, $L_{A1C2}$) is not transferred through the media engine 130; rather, the application pair ($M_{A1C2}$, $L_{A1C2}$) is transmitted from the media engine 14 through the Internet 12 to the media producer/consumer 128 ($C_2$). Similarly, as shown by line 156@$t_{1'}$, as part of the duplexed communication between the media producers/consumers 126, 128, the encumbered instance of digital media ($M_{B1C1}$) and the accompanying special purpose renderer ($L_{A1C1}$) are sent from media engine 130 to the media producer/consumer 126 ($C_1$).

Figure 9:
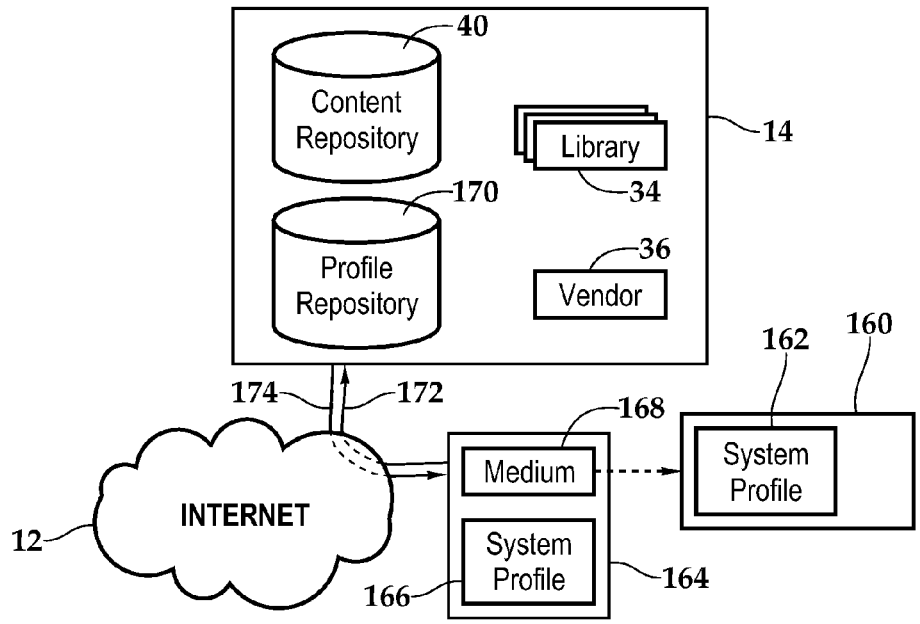
FIG. 9 is a schematic block diagram of one embodiment of a system for digital rights management providing digital media to a media consumer having a remote system platform.

FIG. 9 depicts one embodiment of a system for digital rights management providing digital media to a media consumer 160 having a remote system platform and system profile 162. A media consumer 164, which has access to the media engine 14 by way of the Internet 12, for example, includes a system profile 164 that is distinct from the system profile 162 of the media consumer 160. Further, the media consumer 164 includes a medium 168 having storage that can be transported or exchanged between the media consumer 160 and the media consumer 164. In this embodiment, the medium 168 acts as a storage intermediary between the media consumer 160 and the media consumer 164.

A profile repository 170 is associated with the media engine 14 and is a central place where copies of particular system profiles are stored and maintained. In particular, a copy of the system profile 162 is stored in the profile repository 170. In operation, as depicted by line 172, the media consumer 164 contacts the vendor 36 to obtain the media content. The media content will be consumed by consumer 160 having system profile 162, which may belong to another media consumer or may be a separate platform owned by media consumer 164, for example, as opposed to the system profile 166 which is presently in communication with the media engine 14. The media consumer notifies the vendor 36 which content is desired and that the media content is for consumption on a different platform. In this implementation, the consumer 160, which is the ultimate target for the media content, is a bi-standard during the initial transfer of the media content from the media engine 14 to the consumer 164 having system profile 166.

The vendor 36 forwards the request to the appropriate librarian in library 34 which accesses not only an instance of the encumbered digital media in the content repository, but a representation or artifact of the system profile 162 located in the profile repository 170. The representation of the system profile 162 will be utilized to encumber the content specifically for media consumer 160. The librarian operates on the encumbered digital media to create a unique encumbered instance of the digital media and an associated special purpose renderer which is built for rendering the encumbered instance of the digital media on the system profile 162 of the consumer 160, as opposed to system profile 166. The medium 168, which will be utilized to render and/or transfer the content on the system profile 162, is conditioned with the encumbered instance of the digital media and the associated special purpose renderer. At a later time, via the medium 168, the encumbered instance of the digital media and the associated special purpose renderer are transferred to the platform associated with system profile 162 for consumption.

It should be appreciated that the embodiments described in FIGS. 5A through 9 were presented as non-limiting working examples wherein the components and networked architectures are solely representative of those which can be employed, and are not exhaustive of those available and operative. Other components and networked architectures are within the teachings of the present invention.

Figure 10:
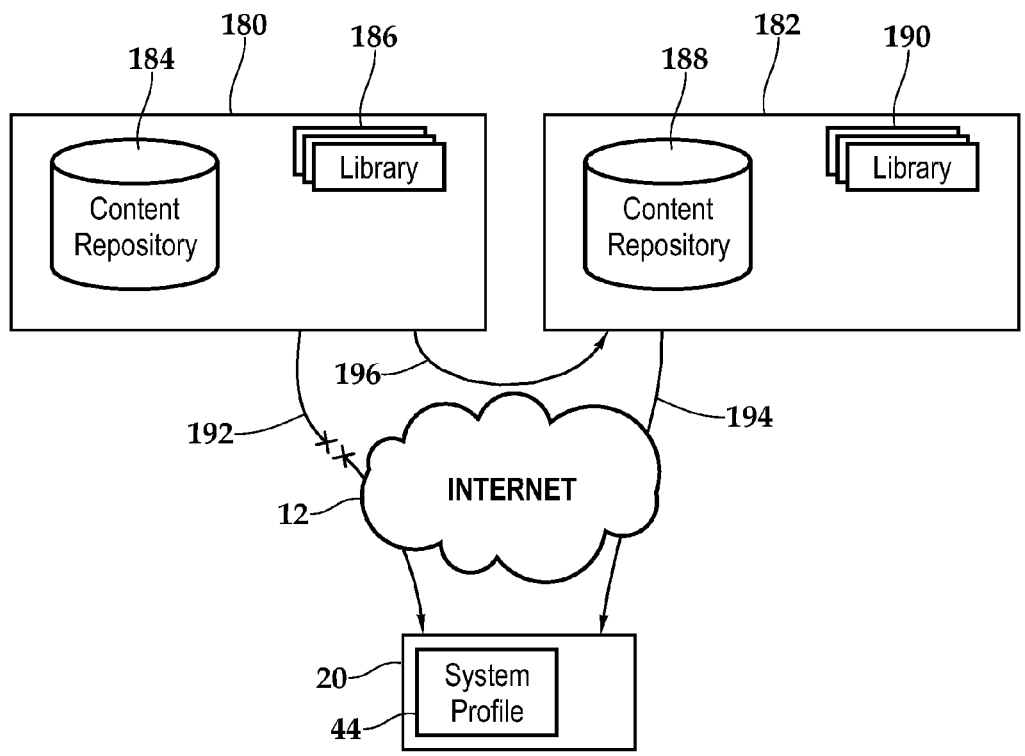
FIG. 10 is a schematic block diagram of one embodiment of a system for digital rights management in a redundant architecture providing digital media to a media consumer.

FIG. 10 depicts one embodiment of a system for digital rights management in a redundant architecture, which includes media engines 180 and 182, providing digital media to a media consumer 20 having a system profile 44. The media engine 180 includes a content repository 184 and a library 186. The redundant instance of media engine 180, media engine 182, similarly includes a content repository 188 and a library 190. As illustrated by broken line 192, media consumer 20 is receiving an application pair including an instance of encumbered digital media and a renderer when the connection between the media engine 180 and media consumer 20 is broken. Substantially simultaneously, as represented by line 194, a connection is formed between the media engine 182 and the media consumer 20 so that the transfer of the content may resume with an instance of encumbered digital media and the renderer. A connection signal, such as connection signal 196, originating from the media engine 180 or the media consumer 20 may initiate the connection between the media engine 182 and the media consumer 20. It should be appreciated that other systems that provide redundancy are within the teachings of the present invention.

Figure 11:
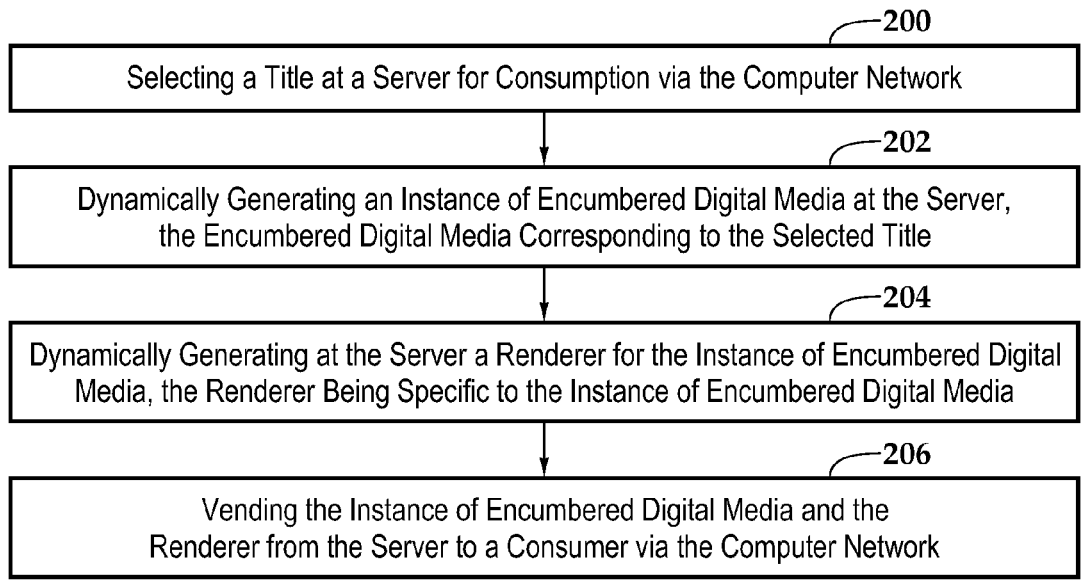
FIG. 11 depicts a flowchart of one embodiment of a method for vending digital media via a computer network to a media consumer.

FIG. 11 depicts a flowchart of one embodiment of a method for vending digital media via a computer network to a consumer. At block 200, a title is selected at a server for consumption via the computer network. At block 202, an instance of encumbered digital media is dynamically generated at the server. The instance of encumbered digital media corresponds to the selected title and, in one implementation, the instance of encumbered digital media is generated from an archive copy of the digital media originally created by the media producer.

At block 204, at the server a special purpose renderer is dynamically generated for the instance of encumbered digital media. The renderer is specific to the instance of encumbered digital media. It should be appreciated that the operations described in blocks 202 and 204 may occur substantially simultaneously or in an order reverse to the order presented. Further, it should be appreciated that the operations of blocks 202 and 204 may occur as part of the same operation. At block 206, the instance of encumbered digital media and the renderer are vended from the server to a consumer via the computer network.

Figure 12:
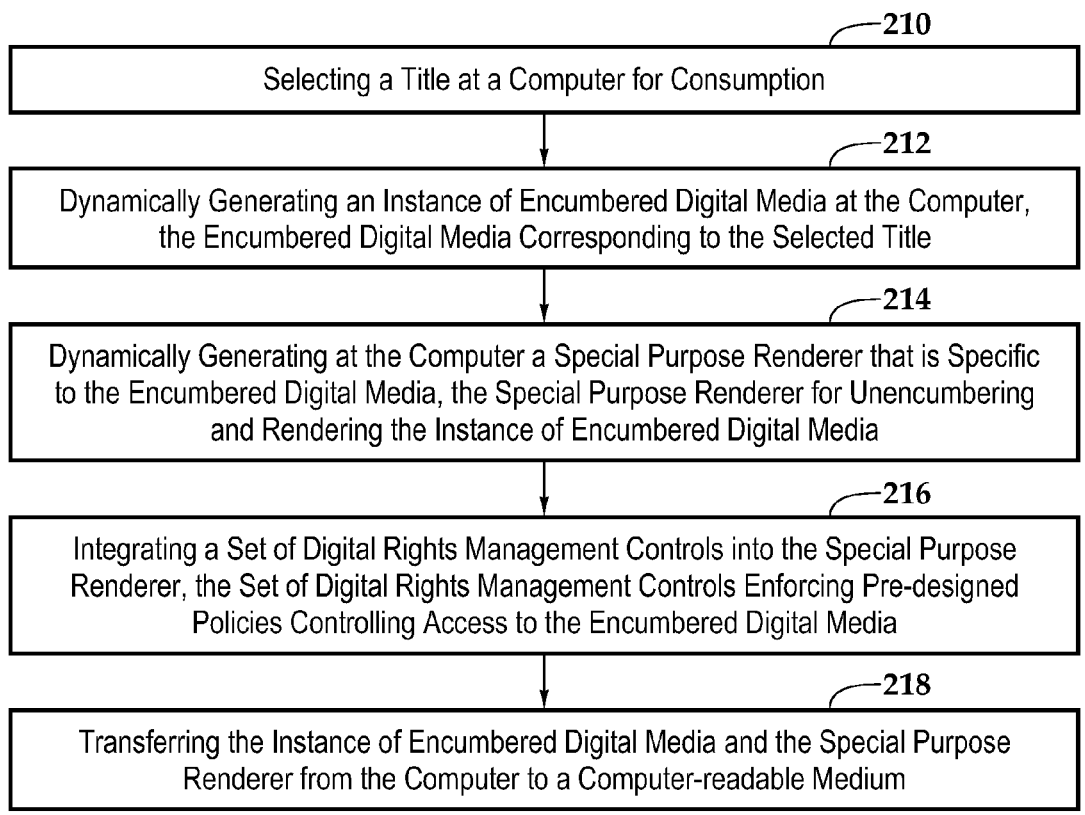
FIG. 12 depicts a flowchart of one embodiment of a method for copying digital media.

FIG. 12 depicts a flowchart of one embodiment of a method for copying digital media. At block 210, a media consumer selects a title associated with a computer, which, for example, may be any electronic device designed to accept data and perform prescribed mathematical and logical operations to reach a result. At block 212, an instance of encumbered digital media, which corresponds to the selected title, is dynamically generated at the computer. At block 214, at the computer, a special purpose renderer that is specific to the encumbered digital media is dynamically generated.

At block 216, a set of digital rights management controls are integrated into the special purpose renderer. At block 218, the instance of encumbered digital media and the special purpose renderer are transferred from the computer to a computer-readable medium. As previously discussed, the transfer may utilize a computer network such as the Internet or, alternatively, the transfer may be from the computer to a local computer-readable medium.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A method, of a server, for vending digital media via a computer network to a consumer, the method comprising:
    selecting a title at a server for consumption via the computer network;
    rendering a first instance of encumbered digital media at the server with a first renderer being a special purpose application specific to the first instance;
    dynamically generating a new and unique encumbered instance of the encumbered digital media at the server, which is a second instance of the encumbered digital media, the encumbered digital media corresponding to the selected title;
    dynamically generating at the server a second renderer for the second instance, the second renderer being an application specific to the second instance and the second renderer being a product of the first renderer operating on the first instance;
    vending the second instance and the second renderer from the server to at least one consumer via the computer network;
    dynamically generating at the server a third renderer for a third instance, the third renderer being an application specific to the third instance and the third renderer being a product of the first renderer operating on the first instance;
    vending the third instance and the third renderer from the server to at least one consumer via the computer network;
    wherein the second renderer is only operable to render the second instance on a particular system profile, the system profile comprising a dynamic object representation of hardware, software, firmware, configuration settings, and data; and
    wherein the first renderer is inoperable to render the second and third instances.

2. The method as recited in claim 1, wherein the second renderer is inoperable to render the first instance.

3. The method as recited in claim 1, wherein dynamically generating the second instance of encumbered digital media and dynamically generating the second renderer occur substantially simultaneously.

4. The method as recited in claim 1, wherein dynamically generating the second instance of encumbered digital media further comprises utilizing a technique selected from the group consisting of obfuscation and compression.

5. A system for vending digital media via a computer network to a consumer, the system comprising:
    means for selecting a title at a server for consumption via the computer network;
    means for rendering a first instance of encumbered digital media at the server with a first renderer being a special purpose application specific to the first instance of encumbered digital media;
    means for dynamically generating a new and unique encumbered instance of encumbered digital media at the server, which is a second instance of the encumbered digital media, the encumbered digital media corresponding to the selected title;
    means for dynamically generating at the server a second renderer for the second instance, the second renderer being specific to the second instance and the second renderer being a product of the first renderer operating on the first instance;
    means for vending the second instance and the second renderer from the server to at least one consumer via the computer network;
    means for dynamically generating a new and unique encumbered instance of encumbered digital media at the server, which is a third instance of the encumbered digital media, the encumbered digital media corresponding to the selected title;

means for dynamically generating at the server a third renderer for the third instance, the third renderer being specific to the second instance and the third renderer being a product of the first renderer operating on the first instance;

means for vending the third instance and the second renderer from the server to at least one consumer via the computer network;

wherein the second renderer is only operable to render the second instance on a particular system profile, the system profile comprising a dynamic object representation of hardware, software, firmware, configuration settings, and data; and wherein the first renderer is inoperable to render the second and third instances.

6. The system as recited in claim 5, wherein the second renderer is inoperable to render the first and third instances.

7. The system as recited in claim 5, wherein the means for dynamically generating the second instance and the means for dynamically generating the second renderer operate substantially simultaneously.

8. The system as recited in claim 5, wherein the means for dynamically generating the second instance of encumbered digital media further comprises means for utilizing a technique selected from the group consisting of obfuscation and compression.

9. A method, of a server, for digital rights management operating in a networked environment, the method comprising:

providing a first instance of encumbered digital media;

providing a first renderer that is a special purpose application specific to the first instance, the first renderer for unencumbering and rendering the first instance, for creating additional instances of the encumbered digital media, and for creating additional renderers that are specific to their respective instances;

operating on the first instance with the first renderer in order to create a copy of the first instance, which is a second instance, and to create a second renderer;

providing the second renderer that is a special purpose application specific to the second instance, the second renderer for unencumbering and rendering the second instance and the second renderer being a product of the first renderer operating on the first instance;

dynamically generating a new and unique encumbered instance of the encumbered digital media at the server, which is a third instance of the encumbered digital media, the encumbered digital media corresponding to a selected title;

dynamically generating at the server a third renderer for the third instance, the third renderer being an application specific to the third instance and the third renderer being a product of the first renderer operating on the first instance;

vending the third instance and the third renderer from the server to at least one consumer via the computer network;

wherein the second renderer is only operable to render the second instance on a particular system profile, the system profile comprising a dynamic object representation of hardware, software, firmware, configuration settings, and data; and wherein the first renderer is inoperable to render the second and third instances.

10. The method as recited in claim 9, further comprising:

operating on the first instance with the first renderer in order to create a copy of the first instance, which is a third instance, and to create a third renderer; and providing the third renderer that is a special purpose application specific to the third instance, the second renderer for unencumbering and rendering the third instance and the third renderer being a product of the first renderer operating on the first instance.

11. The method as recited in claim 10, wherein the second renderer is inoperable to render the first and third instances.

12. The method as recited in claim 10, wherein the third renderer is inoperable to render the first and second instances.

13. The method as recited in claim 9, wherein the first instance is encumbered by at least one technique selected from the group consisting of obfuscation and compression.

* * * * *